United States Patent
Zhang et al.

(10) Patent No.: US 12,532,011 B2
(45) Date of Patent: Jan. 20, 2026

(54) METHOD AND APPARATUS FOR PROCESSING VIDEO COMPRESSION, AND MEDIUM

(71) Applicant: SUZHOU METABRAIN INTELLIGENT TECHNOLOGY CO., LTD., Jiangsu (CN)

(72) Inventors: Zhenlei Zhang, Jiangsu (CN); Tuo Li, Jiangsu (CN); Hongtao Man, Jiangsu (CN); Tongqiang Liu, Jiangsu (CN); Yulong Zhou, Jiangsu (CN); Xiaofeng Zou, Jiangsu (CN); Xiankun Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 112 days.

(21) Appl. No.: 18/572,968

(22) PCT Filed: Jun. 28, 2022

(86) PCT No.: PCT/CN2022/102093
§ 371 (c)(1),
(2) Date: Dec. 21, 2023

(87) PCT Pub. No.: WO2023/134128
PCT Pub. Date: Jul. 20, 2023

(65) Prior Publication Data
US 2024/0292009 A1 Aug. 29, 2024

(30) Foreign Application Priority Data
Jan. 11, 2022 (CN) .......................... 202210024332.8

(51) Int. Cl.
*H04N 19/423* (2014.01)
*H04N 19/172* (2014.01)
(Continued)

(52) U.S. Cl.
CPC ......... *H04N 19/423* (2014.11); *H04N 19/172* (2014.11); *H04N 19/182* (2014.11); *H04N 19/46* (2014.11)

(58) Field of Classification Search
None
See application file for complete search history.

(56) References Cited

U.S. PATENT DOCUMENTS 6,097,364 A * 8/2000 Miyamoto ................ G06T 1/60
345/97
6,124,887 A * 9/2000 Auffret .................. H04N 5/272
348/207.99
(Continued)

FOREIGN PATENT DOCUMENTS

| CN | 108536615 A | 9/2018 |
| CN | 111654699 A | 9/2020 |

(Continued)

OTHER PUBLICATIONS

International Search Report and Written Opinion received for PCT Serial No. PCT/CN2022/102093 on Sep. 6, 2022, 13 pgs.
(Continued)

*Primary Examiner* — Mohammad J Rahman
(74) *Attorney, Agent, or Firm* — Merchant & Gould P.C.

(57) ABSTRACT

Disclosed are a method and apparatus for processing video compression. The method includes: controlling a comparison apparatus to perform frame-wise writing of original video data to an external storage apparatus, and controlling a video compression control component to perform frame-wise reading of the original video data from the external storage apparatus; in response to writing original video data of a non-first frame into the external storage apparatus, and in response to writing the original video data of the current frame into the external storage apparatus, converting the video data into tag information and writing the tag infor-
(Continued)

mation into the external storage apparatus; and in response to reading the original video data of the previous frame from the external storage apparatus, writing the video data corresponding to the current same line number into an internal storage apparatus.

17 Claims, 3 Drawing Sheets

(51) Int. Cl.
  *H04N 19/182* (2014.01)
  *H04N 19/46* (2014.01)

(56) References Cited

U.S. PATENT DOCUMENTS

| | | | |
|---|---|---|---|
| 8,861,875 B1* | 10/2014 | Doucette | H04N 19/136 |
| | | | 382/233 |
| 10,387,099 B2* | 8/2019 | Lee | G06F 21/53 |
| 10,893,285 B2* | 1/2021 | Jiang | H04N 19/11 |
| 11,012,708 B1* | 5/2021 | Seshadri | H04N 19/103 |
| 2008/0267295 A1* | 10/2008 | Sung | H04N 19/587 |
| | | | 375/E7.176 |
| 2016/0100172 A1 | 4/2016 | Hugosson | |
| 2016/0182644 A1* | 6/2016 | Wu | G06F 11/0778 |
| | | | 709/227 |
| 2018/0035126 A1* | 2/2018 | Lee | H04N 19/503 |
| 2018/0089048 A1* | 3/2018 | Zou | G06F 11/3089 |
| 2020/0007879 A1* | 1/2020 | Jiang | H04N 19/70 |
| 2022/0095475 A1* | 3/2022 | Gustavsson | H05K 7/20736 |

FOREIGN PATENT DOCUMENTS

| | | |
|---|---|---|
| CN | 112714338 A | 4/2021 |
| CN | 112804532 A | 5/2021 |
| CN | 113079379 A | 7/2021 |
| CN | 113709490 A | 11/2021 |
| CN | 114051145 A | 2/2022 |

OTHER PUBLICATIONS

Chinese Search Report received for CN Serial No. 2022100243328 on Jan. 11, 2022, 2 pgs.

* cited by examiner

METHOD AND APPARATUS FOR PROCESSING VIDEO COMPRESSION, AND MEDIUM

CROSS-REFERENCE TO RELATED APPLICATIONS

The present application is a National Stage Application of PCT International Application No.: PCT/CN2022/102093 filed on Jun. 28, 2022, which claims priority to Chinese Patent Application 202210024332.8, filed in the China National Intellectual Property Administration on Jan. 11, 2022, the disclosure of which is incorporated herein by reference in its entirety.

TECHNICAL FIELD

The disclosure provides a method for processing video compression and apparatus, and a medium.

BACKGROUND

A baseboard management control chip is configured to monitor the status of a server, such as temperature, and the operation of a fan and a Central Processing Unit (CPU), and also transmit video data of a local server to a remote end through a network for display and monitoring. In general, the video data has a large amount of information, and a transmission network requires a relatively wide bandwidth. Therefore, video data to be transmitted is subjected to compression processing to save the transmission bandwidth and storage space when transmitted over the network. The transmission process of a video compression system in the existing baseboard management control chip is that: first, a Video Graphics Array (VGA) in the baseboard management control chip writes video data of a host into an external storage apparatus, typically using a Double Data Rate Synchronous Dynamic Random Access Memory (DDR SDRAM), DDR for short, then a video compression control component reads original video data from the external storage apparatus and writes the compressed video data into the external storage apparatus, the CPU drives a network card to read the compressed video data from the external storage apparatus, and the network card sends the compressed video data to the remote end through the network for decoding and display, thereby achieving the function of remote monitoring and management.

The inventors realized that a process of first writing the original video data into the external storage apparatus, then reading, by the video compression control component, from the off-chip external storage apparatus for compression processing, writing the compressed video data after compression into the external storage apparatus again, and performing compression processing on the video data requires reading and writing the external storage apparatus multiple times, so that the occupancy rate of a bus of the external storage apparatus is very high, which seriously affects the access of other applications to the external storage apparatus and reduces the performance of the entire server system.

SUMMARY

According to various embodiments disclosed in the disclosure, a method and apparatus for processing video compression, and a medium are provided.

A method for processing video compression includes the following operations.

A comparison apparatus is controlled to perform frame-wise writing of original video data to an external storage apparatus, and a video compression control component is controlled to perform frame-wise reading of the original video data from the external storage apparatus.

In response to the comparison apparatus writing original video data of a non-first frame into the external storage apparatus, it is determined line-by-line whether original video data of a current frame is the same as video data corresponding to original video data of a previous frame at a same line number.

In response to the original video data of the current frame is the same as the video data corresponding to the original video data of the previous frame at the same line number, and in response to controlling the comparison apparatus to write the original video data of the current frame into the external storage apparatus, the video data corresponding to the current same line number is converted into tag information and the tag information is written into the external storage apparatus; and in response to the original video data of the current frame is the same as the video data corresponding to the original video data of the previous frame at the same line number, and in response to controlling the video compression control component to read the original video data of the previous frame from the external storage apparatus, the video data corresponding to the current same line number is written into an internal storage apparatus.

In one or more embodiments, in response to the original video data of the current frame is different from the video data corresponding to the original video data of the previous frame at the same line number, the method further includes the following operations.

In response to controlling the comparison apparatus to write the original video data of the current frame into the external storage apparatus, the video data corresponding to the current same line number is written into the external storage apparatus; and in response to controlling the video compression control component to read the original video data of the previous frame from the external storage apparatus, the video data corresponding to the current same line number is read.

In one or more embodiments, the operation that the comparison apparatus is controlled to perform frame-wise writing of the original video data to the external storage apparatus includes the following operation.

In response to the comparison apparatus writing original video data of a first frame into the external storage apparatus, all the original video data of the first frame is written into the external storage apparatus.

In one or more embodiments, after the video compression control component is controlled to read the original video data of the previous frame from the external storage apparatus, the method further includes the following operations.

The video compression control component is controlled to compress the original video data of the previous frame to obtain compressed video data of the previous frame.

The compressed video data of the previous frame is written into the external storage apparatus.

In one or more embodiments, the operation that the video compression control component is controlled to read the original video data of the previous frame from the external storage apparatus includes the following operation.

In response to the original video data of the previous frame read from the external storage apparatus by the video compression control component containing the tag information, the video data corresponding to original video data of a frame before the previous frame at the same line number is read from the internal storage apparatus, where the original video data of the frame before the previous frame is the previous frame of the original video data of the previous frame.

In one or more embodiments, the operation that the comparison apparatus is controlled to perform frame-wise writing of the original video data to the external storage apparatus, and the video compression control component is controlled to perform frame-wise reading of the original video data from the external storage apparatus includes the following operations.

In response to the comparison apparatus writing the original video data of the current frame into a first external storage component, the video compression control component reads the original video data of the previous frame from a second external storage component.

In response to the comparison apparatus writing the original video data of the current frame into the second external storage component, the video compression control component reads the original video data of the previous frame from the first external storage component.

The external storage apparatus includes the first external storage component and the second external storage component.

In one or more embodiments, the operation that the video compression control component writes the video data corresponding to the original video data of the previous frame at the same line number into the internal storage apparatus, and reads the video data corresponding to the original video data of the frame before the previous frame at the same line number from the internal storage apparatus includes the following operations.

In response to the video compression control component writing the video data corresponding to the original video data of the previous frame at the same line number into a first internal storage component, the video data corresponding to the original video data of the frame before the previous frame at the same line number is read from a second internal storage component.

In response to the video compression control component writing the video data corresponding to the original video data of the previous frame at the same line number into the second internal storage component, the video data corresponding to the original video data of the frame before the previous frame at the same line number is read from the first internal storage component.

The internal storage apparatus includes the first internal storage component and the second internal storage component.

In one or more embodiments, after the comparison apparatus is controlled to write the original video data into the external storage apparatus, the method further includes the following operations.

After the video compression control component performs compression processing on the original video data to obtain the compressed video data, and the compressed video data is stored to the external storage apparatus, a network card is controlled to read the compressed video data from the external storage apparatus.

The network card is controlled to send the compressed video data to a remote end.

An apparatus for processing video compression is provided, which includes a writing component, a determining component, and a same control component.

The writing component is configured to control a comparison apparatus to perform frame-wise writing of original video data to an external storage apparatus, and control a video compression control component to perform frame-wise reading of the original video data from the external storage apparatus.

The determining component is configured to determine, in response to the comparison apparatus writing original video data of a non-first frame into the external storage apparatus, line-by-line whether original video data of a current frame is the same as video data corresponding to original video data of a previous frame at a same line number; and trigger, in response to the original video data of the current frame is the same as the video data corresponding to the original video data of the previous frame at the same line number, the same control component.

The same control component is configured to convert, in response to controlling the comparison apparatus to write the original video data of the current frame into the external storage apparatus, the video data corresponding to the current same line number into tag information and write the tag information into the external storage apparatus; and write, in response to controlling the video compression control component to read the original video data of the previous frame from the external storage apparatus, the video data corresponding to the current same line number into an internal storage apparatus.

An apparatus for processing video compression is provided, which includes a memory and one or more processors.

The memory is configured to store a computer-readable instruction.

The one or more processors are configured to implement the steps of the method for processing video compression according to any one of the above embodiments when executing the computer-readable instruction.

One or more non-transitory computer-readable storage media storing computer-readable instructions are provided. When executed by one or more processors, the computer-readable instructions cause one or more processors to perform the steps of the method for processing video compression according to any one of the above embodiments.

Details of one or more embodiments of the disclosure are given in the drawings and descriptions below. Other features and advantages of the disclosure will become apparent from the description, the drawings and the claims.

BRIEF DESCRIPTION OF THE DRAWINGS

In order to more clearly illustrate the embodiments of the disclosure, the drawings used in the embodiments will be briefly described below. It is apparent that the drawings described below are only some embodiments of the disclosure. Other drawings may further be obtained by those of ordinary skill in the art according to these drawings without creative efforts.

DETAILED DESCRIPTION OF THE EMBODIMENTS

The technical solutions in the embodiments of the disclosure will be clearly and completely described in conjunction with the drawings in the embodiments of the disclosure. It is apparent that the described embodiments are only a part of the embodiments of the disclosure, and not all of them. All other embodiments obtained by those of ordinary skill in the art on the basis of the embodiments in the disclosure without creative work shall fall within the scope of protection of the disclosure.

The core of the disclosure is to provide a method for processing video compression and apparatus, and a medium, so as to reduce the occupation of a video compression function on the bandwidth of a bus of an external storage apparatus.

In order to make the solutions of the disclosure understood by those skilled in the art, the disclosure will be described below in detail in combination with the drawings and the specific implementations.

In order to save the transmission bandwidth and storage space required when video data is transmitted on a network, compression processing is performed on the video data to be transmitted. A VGA in a baseboard management control chip first writes original video data of a host into the external storage apparatus, typically using a DDR SDRAM, then a video compression control component in the baseboard management control chip reads the original video data from the external storage apparatus for video compression processing, the video compression control component writes the compressed video data into the external storage apparatus, a CPU drives a network card to read the compressed video data from the external storage apparatus, and the network card sends the compressed video data to a remote end through the network for decoding and display, thereby achieving the function of remote monitoring and management.

The process of first writing the original video data into the external storage apparatus, then reading, by the video compression control component, from the off-chip external storage apparatus for compression processing, and writing the compressed video data after compression into the external storage apparatus again requires reading and writing the external storage apparatus multiple times, so that the occupancy rate of the bus of the external storage apparatus is very high, which seriously affects the access of other applications to the external storage apparatus. Considering a very low probability that all lines change in video images of two adjacent frames of the video data, there are always multiple lines of data that are the same, and the same data may be repeatedly written into and read from the external storage apparatus.

Figure 1:
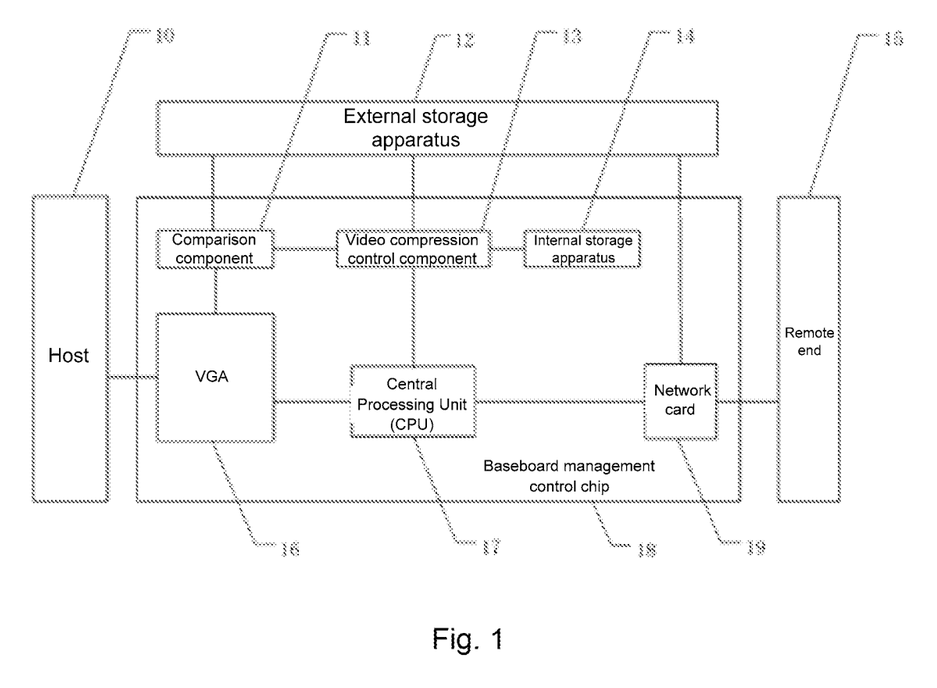
FIG. 1 is a schematic diagram of an application scenario of a method for processing video compression provided by an embodiment of the disclosure.

FIG. 1 is a schematic diagram of an application scenario of a method for processing video compression provided by an embodiment of the disclosure. As shown in FIG. 1, in the application scenario of the method for processing video compression, VGA16 in a baseboard management control chip 18 is configured to receive original video data information sent by a host 10, and send the original video data information to a comparison component 11. The comparison component 11 is configured to write the original video data into an external storage apparatus 12, and a video compression control component 13 reads the original video data from the external storage apparatus 12, compresses the original video data to generate compressed video data, and then writes the compressed video data into the external storage apparatus 12. A CPU 17 reads the compressed video data stored in the external storage apparatus 12 by means of controlling a network card 19, and the network card 19 sends the compressed video data to a remote end. The comparison component 11 is further configured to compare whether the original video data information sent by VGA16 is consistent with the original video data read from the external storage apparatus 12 by the video compression control component 13.

Figure 2:
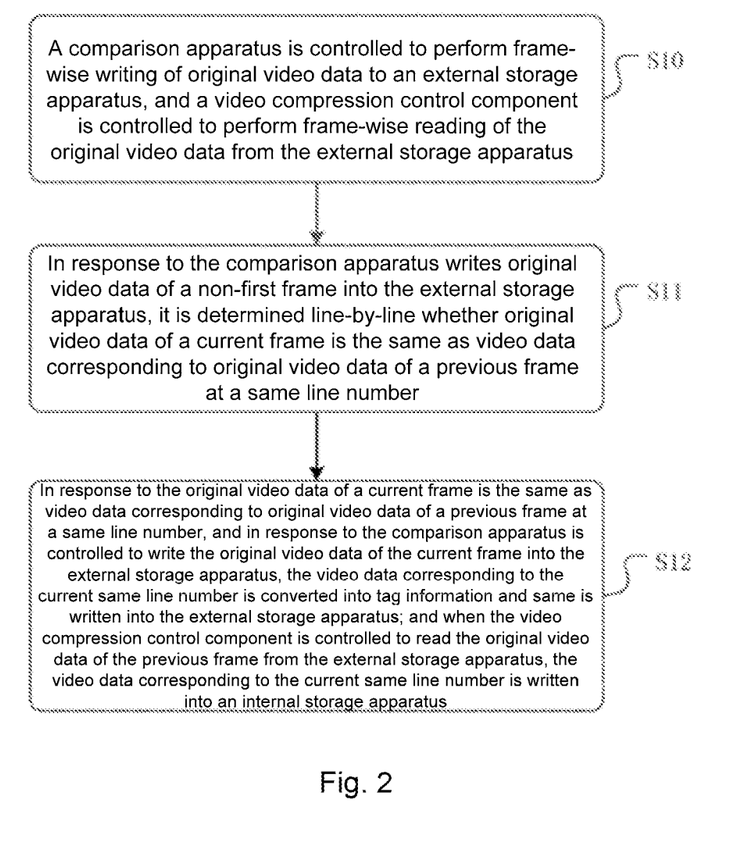
FIG. 2 is a flowchart of a method for processing video compression provided by an embodiment of the disclosure.

FIG. 2 is a flowchart of a method for processing video compression provided by an embodiment of the disclosure. As shown in FIG. 2, the method for processing video compression includes the following operations.

At S10, a comparison apparatus is controlled to perform frame-wise writing of original video data to an external storage apparatus, and a video compression control component is controlled to perform frame-wise reading of the original video data from the external storage apparatus.

At S11, in response to the comparison apparatus writing original video data of a non-first frame into the external storage apparatus, it is determined line-by-line whether original video data of a current frame is the same as video data corresponding to original video data of a previous frame at a same line number.

At S12, in response to the original video data of the current frame is the same as the video data corresponding to the original video data of the previous frame at the same line number, and in response to controlling the comparison apparatus to write the original video data of the current frame into the external storage apparatus, the video data corresponding to the current same line number is converted into tag information and same is written into the external storage apparatus; and in response to the original video data of the current frame is the same as the video data corresponding to the original video data of the previous frame at the same line number, and in response to controlling the video compression control component to read the original video data of the previous frame from the external storage apparatus, the video data corresponding to the current same line number is written into an internal storage apparatus.

It is to be noted that a frame is the smallest unit of a single image picture in an image animation, one frame is a static image, and the image is displayed rapidly and continuously to form an animation. Therefore, when the video data is compressed, frame-wise data compression is usually performed to obtain compressed video data. In some embodiments, the comparison apparatus performs frame-wise writing of the original video data to the external storage apparatus. In addition, each frame of image is composed of pixels, and the pixels are displayed on a screen to see the display content of the screen image. In general, the image contains a certain number of pixels in horizontal and vertical directions, and the size of the image refers to the product of the number of pixels in the horizontal and vertical directions of the image. In some embodiments, when the comparison apparatus performs frame-wise writing of the original video data to the external storage apparatus, it is determined line-by-line whether the original video data of the current frame is the same as the video data corresponding to original video data of the previous frame at the same line number. It is to be noted that the line number refers to position tag information of each pixel of the video image, through which the position of a pixel block in the current video image may be known. Due to a very low probability that all lines of pixel data in images of two adjacent frames change, there are always multiple lines of data that are the same.

It is to be noted that the external storage apparatus refers to a storage apparatus configured to store the original video data and the compressed video data. In addition, the external storage apparatus is further configured to store data information required by other baseboard management control chips to run other processes. In one or more embodiments, the external storage apparatus is a DDR.

The comparison apparatus mentioned in some embodiments is an apparatus configured to compare whether the video data of the current frame is the same as the video data of the previous frame at the same line number. In some embodiments, the host transmits the original video data to the VGA, and the VGA performs preliminary processing on the original video data and sends the original video data to the comparison apparatus.

In some embodiments of the disclosure, when the comparison apparatus writes the original video data of the current frame into the external storage apparatus, the video compression control component reads, from the external storage apparatus, and compresses the original video data of the previous frame to obtain compressed video data of the previous frame.

In the process of writing, by the comparison apparatus, the original video data of the current frame to the external storage apparatus, and reading, by the video compression control component, the original video data of the previous frame from the external storage apparatus, when the comparison apparatus performs frame-wise writing of the original video data of the non-first frame to the external storage apparatus, the video compression control component sends the original video data of the previous frame to the comparison component, and the comparison component determines line-by-line whether the original video data of the current frame is the same as the video data corresponding to the original video data of the previous frame at the same line number. In response to that the original video data of the current frame is the same as the video data corresponding to the original video data of the previous frame at the same line number, when the comparison component writes the original video data of the current frame into the external storage apparatus, the video data corresponding to the same line number is converted into the tag information and same is written into the external storage apparatus. At the same time, when the video compression control component reads the original video data of the previous frame from the external storage apparatus, the video compression control component writes the video data corresponding to the original video data of the previous frame at the same line number into the internal storage apparatus.

It is to be noted that the internal storage apparatus is a storage apparatus of the baseboard management control chip. In general, the internal storage apparatus is a Random Access Memory (RAM), also known as a main memory, which may be read and written at any time (except when refreshing), has very fast speed, and is usually used as a temporary data storage medium of an operating system or other running programs.

It is to be noted that the embodiment does not limit whether a determination is required when the comparison component writes the original video data of the first frame into the external storage apparatus. For example, when the comparison component writes the original video data of the first frame into the external storage apparatus, it is determined line-by-line whether the original video data of the current frame is the same as the video data corresponding to the original video data of the previous frame at the same line number. In response to that a determination result is no due to the absence of the original video data of the previous frame, all the original video data of the first frame is written into the external storage apparatus. The determination may also not be performed, and when the written video data is the original video data of the first frame, all the original video data of the first frame is directly written into the external storage apparatus.

In addition, in one or more embodiments, in response to the internal storage component is fully written, the comparison component is controlled to write the remaining original video data into the external storage apparatus.

Through the method for processing video compression provided by the embodiment, the comparison apparatus is controlled to write the original video data into the external storage apparatus. When the original video data of the non-first frame is written into the external storage apparatus, and the original video data of the current frame is the same as the video data corresponding to the original video data of the previous frame at the same line number, the comparison apparatus is controlled to convert the video data corresponding to the original video data of the current frame at the same line number into the tag information and write the tag information into the external storage apparatus, and the video compression control component is controlled to read the video data corresponding to the original video data of the previous frame at the same line number from the external storage apparatus, and write same into the internal storage apparatus. When the original video data of the current frame is the same as the video data corresponding to the original video data of the previous frame at the same line number, the video data of the current frame at the same line number is not written into the external storage apparatus. Due to a very low probability that the video data corresponding to all line numbers change in the video data of two adjacent frames in a video, there are a large amount of video data corresponding to the same line number that is the same. Through the method provided by the disclosure, the video data corresponding to the same line number is not written into the external storage apparatus, so that the read-write amount of the external storage apparatus is reduced, and the occupation of the bandwidth of the bus of the external storage apparatus when the video data is compressed is reduced.

In one or more embodiments, in response to the original video data of the current frame is different from the video data corresponding to the original video data of the previous frame at the same line number, the method further includes the following operations.

In response to controlling the comparison apparatus to write the original video data of the current frame into the external storage apparatus, the video data corresponding to the current same line number is written into the external storage apparatus; and in response to controlling the video compression control component to read the original video data of the previous frame from the external storage apparatus, the video data corresponding to the current same line number is read.

It is to be noted that, in some embodiments, when the control comparison apparatus is controlled to write the original video data of the current frame into the external storage apparatus, the video data corresponding to the current same line number is written into the external storage apparatus, which means that all the video data corresponding to the current same line number is written into the external storage apparatus, including video data information, flag bit information, etc. When the video compression control component is controlled to reads the original video data of the previous frame from the external storage apparatus, the video data corresponding to the current same line number is read, which means that after the video compression control component reads the original video data of the previous frame from the external storage apparatus, the video data corresponding to the same line number is not processed.

When the original video data of the current frame is different from the video data corresponding to the original video data of the previous frame at the same line number, in order to ensure the integrity of the video data information, when the comparison apparatus is controlled to write the original video data of the current frame into the external storage apparatus, all the video data corresponding to the same line number is written into the external storage apparatus, and the video compression control component is controlled to read the video data corresponding to the original video data of the previous frame at the same line number from the external storage apparatus.

In one or more embodiments, in order to speed up the processing process of video compression in the baseboard management control chip, the operation that the comparison apparatus is controlled to perform frame-wise writing of the original video data to the external storage apparatus includes the following operation.

In response to the comparison apparatus writing original video data of a first frame into the external storage apparatus, all the original video data of the first frame is written into the external storage apparatus.

When the written video data is the original video data of the first frame, the comparison component does not perform determination processing on data of the first frame, and directly writes all the original video data of the first frame into the external storage apparatus to speed up the process of performing compression processing on the video.

In one or more embodiments, after the video compression control component is controlled to read the original video data of the previous frame from the external storage apparatus, the method further includes the following operations.

The video compression control component is controlled to compress the original video data of the previous frame to obtain compressed video data of the previous frame; and the compressed video data of the previous frame is written into the external storage apparatus.

After the video compression control component mentioned in some embodiments reads the video data corresponding to the original video data of the previous frame at the same line number from the external storage apparatus, it means that the video compression control component is controlled to read the original video data of the previous frame from the external storage apparatus, the comparison apparatus determines line-by-line whether the original video data of the current frame is the same as the video data corresponding to the original video data of the previous frame at the same line number, and the video compression control component writes the same video data corresponding to the same line number into the internal storage apparatus. In response to the video data corresponding to the same line number is different, processing is not performed. After each line of the video data of the original video data of the current frame and the original video data of the previous frame is determined, the video compression control component compresses the original video data of the previous frame to obtain the compressed video data of the previous frame, and the compressed video data of the previous frame is written into the external storage apparatus.

Through the embodiment, the video compression control component performs compression processing on the original video of the previous frame and stores same in the external storage apparatus, so as to facilitate subsequent calling.

According to the above embodiments, in response to that the original video data of the previous frame read from the external storage apparatus by the video compression control component is the original video data of the first frame, when the comparison component writes the original video data of the first frame into the external storage apparatus, the processing of converting the video data into the flag information is not performed on the video data of the first frame, and the original video data read by the video compression control component does not contain the tag information. In response to that the original video data of the previous frame read from the external storage apparatus by the video compression control component is the original video data of the non-first frame, in response to the comparison component writes the original video data of the previous frame, it is determined whether the original video data of the previous frame is the same as the video data corresponding to original video data of a frame before the previous frame at the same line number, and the original video data of the previous frame may contain the tag information. In one or more embodiments, the operation that the video compression control component is controlled to read the original video data of the previous frame from the external storage apparatus includes the following operation.

In response to the original video data of the previous frame read from the external storage apparatus by the video compression control component containing the tag information, the video data corresponding to the original video data of the frame before the previous frame at the same line number is read from the internal storage apparatus, where the original video data of the frame before the previous frame is the previous frame of the original video data of the previous frame.

When the comparison apparatus writes the original video data of the previous frame into the external storage apparatus, it may be determined line-by-line whether the original video data of the previous frame is the same as the video data corresponding to the original video data of the frame before the previous frame at the same line number, In response to that the original video data of the previous frame is the same as the video data corresponding to the original video data of the frame before the previous frame at the same line number, when the comparison apparatus writes the original video data of the previous frame into the external storage apparatus, the video data corresponding to the current same line number is converted into the tag information and same is written into the external storage apparatus. When the video compression control component reads the original video data of the frame before the previous frame from the external storage apparatus, the video data corresponding to the current same line number is written into the internal storage apparatus. Therefore, when the video compression control component reads the original video data of the previous frame from the external storage apparatus, In response to the original video data of the previous frame contains the tag information, the video data corresponding to the original video data of the frame before the previous frame is read from the internal storage apparatus, and according to the logo information, the video data stored in the internal storage apparatus and the original video data read from the external storage apparatus are integrated to obtain the complete original video data.

The same video data corresponding to the video data of two adjacent frames at the same line number is stored in the internal storage apparatus, so that the read-write amount of the external storage apparatus is reduced, and the occupation of the bandwidth of the bus of the external storage apparatus when the video data is compressed is reduced.

According to the above embodiments, the video compression control component reads the original video data of the previous frame from the external storage apparatus while the comparison apparatus writes the original video data of the current frame into the external storage apparatus, in order to speed up the data processing process, in one or more embodiments, the operation that the comparison apparatus performs frame-wise writing of the original video data to the external storage apparatus, and the video compression control component reads the original video data of the previous frame from the external storage apparatus includes the following operations.

In response to the comparison apparatus writing the original video data of the current frame into a first external storage component, the video compression control component reads the original video data of the previous frame from a second external storage component.

In response to the comparison apparatus writing the original video data of the current frame into the second external storage component, the video compression control component reads the original video data of the previous frame from the first external storage component.

The external storage apparatus includes the first external storage component and the second external storage component.

The first external storage component and the second external storage component mentioned in some embodiments are two independent storage areas allocated by the external storage apparatus. In response to the comparison apparatus writes the original video data of the current frame into the first external storage component, the video compression control component reads the original video data of the previous frame from the second external storage component. In response to that the comparison apparatus writes the original video data of the current frame into the second external storage component, the video compression control component reads the original video data of the previous frame from the first external storage component. That is, through two storage areas, namely the first external storage component and the second external storage component, a ping-pong operation is achieved, which speeds up the data processing process.

According to the above embodiments, in one or more embodiments, the operation that the video compression control component writes the video data corresponding to the original video data of the previous frame at the same line number into the internal storage apparatus, and reads the video data corresponding to the original video data of the frame before the previous frame at the same line number from the internal storage apparatus includes the following operations.

In response to the video compression control component writes the video data corresponding to the original video data of the previous frame at the same line number into a first internal storage component, the video data corresponding to the original video data of the frame before the previous frame at the same line number is read from a second internal storage component.

In response to the video compression control component writes the video data corresponding to the original video data of the previous frame at the same line number into the second internal storage component, the video data corresponding to the original video data of the frame before the previous frame at the same line number is read from the first internal storage component.

The internal storage apparatus includes the first internal storage component and the second internal storage component.

The first internal storage component and the second internal storage component mentioned in some embodiments are two independent storage areas allocated by the internal storage apparatus. In response to the video compression control component writes the video data corresponding to the original video data of the previous frame at the same line number into the first internal storage component, the video data corresponding to the original video data of the frame before the previous frame at the same line number is read from the second internal storage component. In response to the video compression control component writes the video data corresponding to the original video data of the previous frame at the same line number into the second internal storage component, the video data corresponding to the original video data of the frame before the previous frame at the same line number is read from the first internal storage component. Through two storage areas, namely the first internal storage component and the second internal storage component, a ping-pong operation is achieved, which speeds up the data processing process.

According to the above embodiments, the compressed video data after preset processing needs to be sent to the remote end. In one or more embodiments, after the comparison apparatus is controlled to perform frame-wise writing of the original video data to the external storage apparatus, the method further includes the following operations.

After the video compression control component performs compression processing on the original video data to obtain the compressed video data, and the compressed video data is stored to the external storage apparatus, a network card is controlled to read the compressed video data from the external storage apparatus.

The network card is controlled to send the compressed video data to a remote end.

The video compression control component performs compression processing on all the original video data and stores same to the external storage apparatus, and the CPU of the baseboard management control chip controls the network card to read the compressed video data from the external storage apparatus, and controls the network card to send the compressed video data to the remote end. After compression processing is performed on the video data, the amount of the video data is reduced, and the compressed video data is sent by the network card to the remote end for decoding and display, thereby achieving the function of remote monitoring and management.

In the above embodiments, the method for processing video compression is described in detail, and the disclosure further provides embodiments corresponding to a apparatus for processing video compression. It is to be noted that the disclosure describes the embodiments of the apparatus part from two perspectives, one based on functional components and the other based on hardware.

Figure 3:
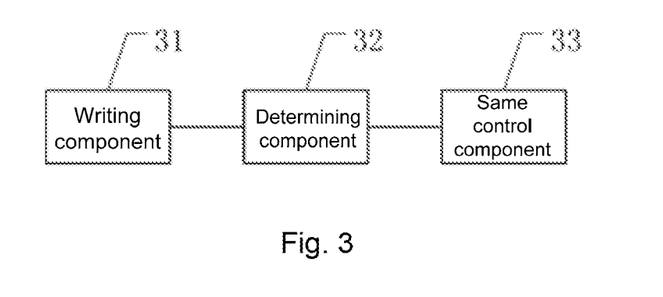
FIG. 3 is a schematic diagram of an apparatus for processing video compression provided by an embodiment of the disclosure.

FIG. 3 is a schematic diagram of a apparatus for processing video compression provided by an embodiment of the disclosure. As shown in FIG. 3, the apparatus for processing video compression includes a writing component, a determining component, and a same control component.

The writing component 31 is configured to control a comparison apparatus to perform frame-wise writing of original video data to an external storage apparatus, and control a video compression control component to perform frame-wise reading of the original video data from the external storage apparatus.

The determining component 32 is configured to determine, in response to the comparison apparatus writing original video data of a non-first frame into the external storage apparatus, line-by-line whether original video data of a current frame is the same as video data corresponding to original video data of a previous frame at a same line number; and trigger, in response to the original video data of the current frame is the same as the video data corresponding to the original video data of the previous frame at the same line number, the same control component 33.

The same control component 33 is configured to convert, in response to controlling the comparison apparatus to write the original video data of the current frame into the external storage apparatus, the video data corresponding to the current same line number into tag information and write the tag information into the external storage apparatus; and write, in response to controlling the video compression control component to read the original video data of the previous frame from the external storage apparatus, the video data corresponding to the current same line number into an internal storage apparatus.

The writing component 31 controls the comparison apparatus to perform frame-wise writing of the original video data to the external storage apparatus, and controls the video compression control component to perform frame-wise reading of the original video data from the external storage apparatus. In response to the comparison apparatus writing the original video data of the non-first frame into the external storage apparatus, the determining component 32 determines line-by-line whether the original video data of the current frame is the same as the video data corresponding to the original video data of the previous frame at the same line number, and triggers, in response to the original video data of the current frame is the same as the video data corresponding to the original video data of the previous frame at the same line number, the same control component 33. The same control component 33 converts, in response to controlling the comparison apparatus to write the original video data of the current frame into the external storage apparatus, the video data corresponding to the current same line number into the tag information and writes same into the external storage apparatus, and writes, in response to controlling the video compression control component to read the original video data of the previous frame from the external storage apparatus, the video data corresponding to the current same line number into the internal storage apparatus.

When the original video data of the current frame is the same as the video data corresponding to the original video data of the previous frame at the same line number, the video data of the current frame at the same line number is not written into the external storage apparatus. Due to a very low probability that the video data corresponding to all line numbers change in the video data of two adjacent frames in a video, there are a large amount of video data corresponding to the same line number that is the same. Through the method provided by the disclosure, the video data corresponding to the same line number is not written into the external storage apparatus, so that the read-write amount of the external storage apparatus is reduced, and the occupation of the bandwidth of the bus of the external storage apparatus when the video data is compressed is reduced.

In one or more embodiments, the apparatus for processing video compression further includes a dissimilarity control component.

The dissimilarity control component is configured to write, in response to the original video data of the current frame is different from the video data corresponding to the original video data of the previous frame at the same line number, and in response to controlling the comparison apparatus to write the original video data of the current frame into the external storage apparatus, the video data corresponding to the current same line number into the external storage apparatus; and read, in response to the original video data of the current frame is different from the video data corresponding to the original video data of the previous frame at the same line number, and in response to controlling the video compression control component to read the original video data of the previous frame from the external storage apparatus, the video data corresponding to the current same line number.

In one or more embodiments, the apparatus for processing video compression further includes a compression component and a compression writing component. The compression component is configured to control the video compression control component to compress the original video data of the previous frame to obtain compressed video data of the previous frame. The compression writing component is configured to write the compressed video data of the previous frame into the external storage apparatus.

In one or more embodiments, the apparatus for processing video compression further includes a reading component. The reading component is configured to read, in response to the original video data of the previous frame read from the external storage apparatus by the video compression control component containing the tag information, video data corresponding to original video data of a frame before the previous frame at the same line number from the internal storage apparatus.

In one or more embodiments, the writing component 31 is configured to write, in response to the comparison apparatus writing original video data of a first frame into the external storage apparatus, all the original video data of the first frame into the external storage apparatus.

In one or more embodiments, the writing component 31 is configured to cause, in response to the comparison apparatus writes the original video data of the current frame into a first external storage component, the video compression control component to read the original video data of the previous frame from a second external storage component; and cause, in response to the comparison apparatus writing the original video data of the current frame into the second external storage component, the video compression control component to read the original video data of the previous frame from the first external storage component. The external storage apparatus includes the first external storage component and the second external storage component.

In one or more embodiments, the reading component is further configured to control, after the video compression control component performs compression processing on the original video data to obtain the compressed video data, and the compressed video data is stored to the external storage apparatus, a network card to read the compressed video data from the external storage apparatus; and control the network card to send the compressed video data to a remote end.

The specific limitations on the apparatus for processing video compression may be referred to the above limitations on the method for processing video compression, which will not be elaborated herein. Part or all of components of the above apparatus for processing video compression may be implemented by means of software, hardware and a combination thereof. The above components are embedded in the hardware form or independent of a processor in a computer device, and are also stored in a memory of the computer device in the software form, so that the processor calls and executes operations corresponding to the above components.

Figure 4:
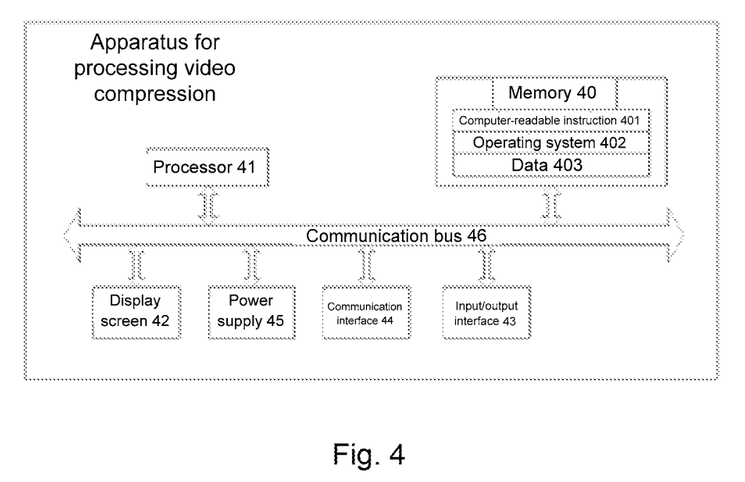
FIG. 4 is a structural diagram of another apparatus for processing video compression provided by an embodiment of the disclosure.

In one or more embodiments, as shown in FIG. 4, FIG. 4 is a structural diagram of another apparatus for processing video compression provided by an embodiment of the disclosure. The apparatus for processing video compression includes: a memory 40, configured to store a computer-readable instruction; and one or more processors 41.

The one or more processors 41 are configured to implement the steps of the method for processing video compression according to any one of the above embodiments when executing the computer-readable instruction.

The apparatus for processing video compression provided by the embodiment may include, but is not limited to, a smart phone, a tablet computer, a notebook computer, or a desktop computer, etc.

The processor 41 may include one or more processing cores, such as a 4-core processor, an 8-core processor, etc. The processor 41 may be implemented in at least one hardware form of a Digital Signal Processor (DSP), a Field-Programmable Gate Array (FPGA), and a Programmable Logic Array (PLA). The processor 41 may further include a main processor and a coprocessor. The main processor is a processor configured to process data in a wake state, also known as a CPU, and the coprocessor is a low-power processor configured to process data in a standby state. In some embodiments, the processor 41 may be integrated with a Graphics Processing Unit (GPU), which is responsible for rendering and drawing the content that a display screen needs to display. In some embodiments, the processor 41 may further include an Artificial intelligence (AI) processor, which is configured to process computational operations related to machine learning.

The memory 40 may include one or more computer-readable storage media, which may be non-transient. The memory 40 may further include a high speed RAM and a non-transitory memory such as one or more magnetic storage apparatuses and a flash memory. In some embodiments, the memory 40 is configured to store at least the following computer-readable instruction 401. The computer-readable instruction, after is loaded and executed by the processor 41, is capable of implementing the relevant steps of the method for processing video compression disclosed in any of the foregoing embodiment. In addition, resources stored by the memory 40 may further include an operating system 402 and data 403, etc., and a storage method may be transient storage or permanent storage. The operating system 402 may include Windows, Unix, Linux, etc. The data 403 may include, but is not limited to, data involved in implementing a method for processing video compression, etc.

In some embodiments, the apparatus for processing video compression may further include a display screen 42, an input/output interface 43, a communication interface 44, a power supply 45, and a communication bus 46.

It may be understood by those skilled in the art that the structure shown in FIG. 4 does not constitute a limitation to the apparatus for processing video compression, and may include more or fewer components than shown in the figure.

Through the apparatus for processing video compression provided by the embodiment includes the memory and the processor. When executing a program stored in the memory, the processor may implement the method for processing video compression according to any of the above embodiments. A comparison apparatus is controlled to write original video data into an external storage apparatus, and when original video data of a non-first frame is written into the external storage apparatus, and original video data of a current frame is the same as video data corresponding to original video data of a previous frame at a same line number, the comparison apparatus is controlled to convert the video data corresponding to the original video data of the current frame at the same line number into tag information and write the tag information into the external storage apparatus, and a video compression control component is controlled to read the video data corresponding to the original video data of the previous frame at the same line number from the external storage apparatus, and write same into an internal storage apparatus. When the original video data of the current frame is the same as the video data corresponding to the original video data of the previous frame at the same line number, the video data of the current frame at the same line number is not written into the external storage apparatus. Due to a very low probability that the video data corresponding to all line numbers change in the video data of two adjacent frames in a video, there are a large amount of video data corresponding to the same line number that is the same, and the video data corresponding to the same line number is not written into the external storage apparatus, so that the read-write amount of the external storage apparatus is reduced, and the occupation of the bandwidth of the bus of the external storage apparatus when the video data is compressed is reduced.

Figure 5:
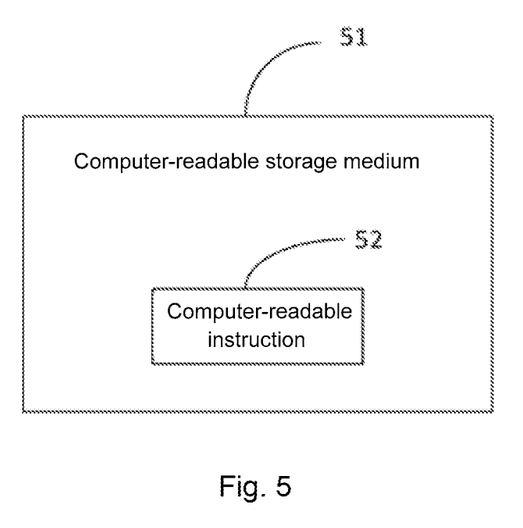
FIG. 5 is a structural diagram of a computer-readable storage medium provided by an embodiment of the disclosure.

Finally, as shown in FIG. 5, the disclosure further provides embodiments corresponding to one or more non-transitory computer-readable storage media storing computer-readable instructions. The computer-readable storage medium 51 stores the computer-readable instruction 52, and when executed by the processor, the computer-readable instruction 52 implements the steps as described in any of the above method embodiments.

It is understood that, when is realized in form of software functional unit and sold or used as an independent product, the method in the above embodiment may be stored in a computer-readable storage medium. Based on this understanding, the technical solutions of the disclosure essentially or the parts that contribute to the conventional art, or all or part of the technical solutions may be embodied in the form of a software product. The computer software product is stored in a storage medium to execute all or part of the steps of the method described in the various embodiments of the disclosure. The foregoing storage medium includes: various media capable of storing program codes such as a USB disk, a mobile hard disk drive, a Read-Only Memory (ROM), a magnetic disk, or an optical disk.

The computer-readable storage medium provided by the embodiment stores the computer-readable instruction. When executing a program, the processor may implement the method for processing video compression according to any of the above embodiments. A comparison apparatus is controlled to write original video data into an external storage apparatus, and when original video data of a non-first frame is written into the external storage apparatus, and original video data of a current frame is the same as video data corresponding to original video data of a previous frame at a same line number, the comparison apparatus is controlled to convert the video data corresponding to the original video data of the current frame at the same line number into tag information and write the tag information into the external storage apparatus, and a video compression control component is controlled to read the video data corresponding to the original video data of the previous frame at the same line number from the external storage apparatus, and write same into an internal storage apparatus. When the original video data of the current frame is the same as the video data corresponding to the original video data of the previous frame at the same line number, the video data of the current frame at the same line number is not written into the external storage apparatus. Due to a very low probability that the video data corresponding to all line numbers change in the video data of two adjacent frames in a video, there are a large amount of video data corresponding to the same line number that is the same, and the video data corresponding to the same line number is not written into the external storage apparatus, so that the read-write amount of the external storage apparatus is reduced, and the occupation of the bandwidth of the bus of the external storage apparatus when the video data is compressed is reduced.

The method for processing video compression, the apparatus for processing video compression, and the computer-readable storage medium provided by the disclosure are described in detail above. The various embodiments in the present specification are described in a progressive manner, and each embodiment focuses on differences from other embodiments, and the same similar parts between the various embodiments may be referred to each other. For the apparatus disclosed in the embodiment, since it corresponds to the method disclosed in the embodiment, the description is relatively simple, and the relevant parts may be referred to the method part. It is to be noted that a number of variations and modifications may be made by those of ordinary skill in the art without departing from the principle of the disclosure, and all fall within the scope of protection of the claims of the disclosure.

It is also to be noted that relational terms "first", "second" and the like in the specification are adopted only to distinguish one entity or operation from another entity or operation and not always to require or imply existence of any such practical relationship or sequence between the entities or operations. Furthermore, terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The invention claimed is:

1. A method for processing video compression, comprising:
   controlling a comparison apparatus to perform frame-wise writing of original video data to an external storage apparatus, and controlling a video compression control component to perform frame-wise reading of the original video data from the external storage apparatus;
   in response to the comparison apparatus writing original video data of a non-first frame into the external storage apparatus, determining line-by-line whether original video data of a current frame is the same as video data corresponding to original video data of a previous frame at a same line number; and
   in response to the original video data of the current frame is the same as the video data corresponding to the original video data of the previous frame at the same line number, and in response to controlling the comparison apparatus to write the original video data of the current frame into the external storage apparatus, converting the video data corresponding to a current same line number into tag information and writing the tag information into the external storage apparatus; and
   in response to the original video data of the current frame is the same as the video data corresponding to the original video data of the previous frame at the same line number, and in response to controlling the video compression control component to read the original video data of the previous frame from the external storage apparatus, writing video data corresponding to the current same line number into an internal storage apparatus;
   wherein the step of in response to the original video data of the current frame is different from the video data corresponding to the original video data of the previous frame at the same line number further comprises: in response to controlling the comparison apparatus to write the original video data of the current frame into the external storage apparatus, writing the video data corresponding to the current same line number into the external storage apparatus; and in response to controlling the video compression control component to read the original video data of the previous frame from the external storage apparatus, reading the video data corresponding to the current same line number;
   wherein the external storage apparatus comprises a first external storage component and a second external storage component; the controlling the comparison apparatus to perform frame-wise writing of original video data to the external storage apparatus, and controlling the video compression control component to perform frame-wise reading of the original video data from the external storage apparatus comprises: in response to the comparison apparatus writing the original video data of the current frame into the first external storage component, reading, by the video compression control component, the original video data of the previous frame from the second external storage component; and in response to the comparison apparatus writing the original video data of the current frame into the second external storage component, reading, by the video compression control component, the original video data of the previous frame from the first external storage component;
   wherein the internal storage apparatus comprises a first internal storage component and a second internal storage component; the writing, by the video compression control component, the video data corresponding to the original video data of the previous frame at the current same line number into the internal storage apparatus, and reading video data corresponding to original video data of the frame before the previous frame at the same line number from the internal storage apparatus comprises: in response to the video compression control component writing the video data corresponding to the original video data of the previous frame at the same line number into the first internal storage component, reading the video data corresponding to the original video data of the frame before the previous frame at the same line number from the second internal storage component; and in response to the video compression control component writing the video data corresponding to the original video data of the previous frame at the same line number into the second internal storage component, reading the video data corresponding to the original video data of the frame before the previous frame at the same line number from the first internal storage component.

2. The method of claim 1, wherein the controlling the comparison apparatus to perform frame-wise writing of original video data to the external storage apparatus comprises:

in response to the comparison apparatus writing original video data of a first frame into the external storage apparatus, writing all the original video data of the first frame into the external storage apparatus.

3. The method of claim 1, wherein after the video compression control component is controlled to read the original video data of the previous frame from the external storage apparatus, the method further comprises:

controlling the video compression control component to compress the original video data of the previous frame to obtain compressed video data of the previous frame; and writing the compressed video data of the previous frame into the external storage apparatus.

4. The method of claim 1, wherein the controlling the video compression control component to read the original video data of the previous frame from the external storage apparatus comprises:

in response to the original video data of the previous frame read from the external storage apparatus by the video compression control component containing the tag information, reading video data corresponding to original video data of a frame before the previous frame at the same line number from the internal storage apparatus.

5. The method of claim 4, wherein after the comparison apparatus is controlled to perform frame-wise writing of the original video data to the external storage apparatus, the method further comprises:

after the video compression control component performs compression processing on the original video data to obtain the compressed video data, and the compressed video data is stored to the external storage apparatus, controlling a network card to read the compressed video data from the external storage apparatus; and controlling the network card to send the compressed video data to a remote end.

6. An apparatus for processing video compression, comprising:

a memory, configured to store a computer-readable instruction; and one or more processors, configured to when executing the computer-readable instruction, cause the one or more processors to:

control a comparison apparatus to perform frame-wise writing of original video data to an external storage apparatus, and control a video compression control component to perform frame-wise reading of the original video data from the external storage apparatus;

in response to the comparison apparatus writes original video data of a non-first frame into the external storage apparatus, determine line-by-line whether original video data of a current frame is the same as video data corresponding to original video data of a previous frame at a same line number; and in response to the original video data of the current frame is the same as the video data corresponding to the original video data of the previous frame at the same line number, and in response to controlling the comparison apparatus to write the original video data of the current frame into the external storage apparatus, convert the video data corresponding to a current same line number into tag information and write the tag information into the external storage apparatus; and in response to the original video data of the current frame is the same as the video data corresponding to the original video data of the previous frame at the same line number, and in response to controlling the video compression control component to read the original video data of the previous frame from the external storage apparatus, write video data corresponding to the current same line number into an internal storage apparatus;

in response to the original video data of the current frame is different from the video data corresponding to the original video data of the previous frame at the same line number, and control the comparison apparatus to write the original video data of the current frame into the external storage apparatus, writing the video data corresponding to the current same line number into the external storage apparatus; and in response to controlling the video compression control component to read the original video data of the previous frame from the external storage apparatus, read the video data corresponding to the current same line number;

wherein the external storage apparatus comprises a first external storage component and a second external storage component; the controlling the comparison apparatus to perform frame-wise writing of original video data to the external storage apparatus, and controlling the video compression control component to perform frame-wise reading of the original video data from the external storage apparatus comprises: in response to the comparison apparatus writing the original video data of the current frame into the first external storage component, reading, by the video compression control component, the original video data of the previous frame from the second external storage component; and in response to the comparison apparatus writing the original video data of the current frame into the second external storage component, reading, by the video compression control component, the original video data of the previous frame from the first external storage component;

wherein the internal storage apparatus comprises a first internal storage component and a second internal storage component; the writing, by the video compression control component, the video data corresponding to the original video data of the previous frame at the current same line number into the internal storage apparatus, and reading video data corresponding to original video data of the frame before the previous frame at the same line number from the internal storage apparatus comprises: in response to the video compression control component writing the video data corresponding to the original video data of the previous frame at the same line number into the first internal storage component, reading the video data corresponding to the original video data of the frame before the previous frame at the same line number from the second internal storage component; and in response to the video compression control component writing the video data corresponding to the original video data of the previous frame at the same line number into the second internal storage component, reading the video data corresponding to the original video data of the frame before the previous frame at the same line number from the first internal storage component.

7. One or more non-transitory computer-readable storage media storing computer-readable instructions, when executed by one or more processors, the computer-readable instructions causing one or more processors to:
   control a comparison apparatus to perform frame-wise writing of original video data to an external storage apparatus, and control a video compression control component to perform frame-wise reading of the original video data from the external storage apparatus;
   in response to the comparison apparatus writes original video data of a non-first frame into the external storage apparatus, determine line-by-line whether original video data of a current frame is the same as video data corresponding to original video data of a previous frame at a same line number; and
   in response to the original video data of the current frame is the same as the video data corresponding to the original video data of the previous frame at the same line number, and in response to controlling the comparison apparatus to write the original video data of the current frame into the external storage apparatus, convert the video data corresponding to a current same line number into tag information and write the tag information into the external storage apparatus; and
   in response to the original video data of the current frame is the same as the video data corresponding to the original video data of the previous frame at the same line number, and in response to controlling the video compression control component to read the original video data of the previous frame from the external storage apparatus, write video data corresponding to the current same line number into an internal storage apparatus;
   in response to the original video data of the current frame is different from the video data corresponding to the original video data of the previous frame at the same line number, and control the comparison apparatus to write the original video data of the current frame into the external storage apparatus, writing the video data corresponding to the current same line number into the external storage apparatus; and in response to controlling the video compression control component to read the original video data of the previous frame from the external storage apparatus, read the video data corresponding to the current same line number;
   wherein the external storage apparatus comprises a first external storage component and a second external storage component; the controlling the comparison apparatus to perform frame-wise writing of original video data to the external storage apparatus, and controlling the video compression control component to perform frame-wise reading of the original video data from the external storage apparatus comprises: in response to the comparison apparatus writing the original video data of the current frame into the first external storage component, reading, by the video compression control component, the original video data of the previous frame from the second external storage component; and in response to the comparison apparatus writing the original video data of the current frame into the second external storage component, reading, by the video compression control component, the original video data of the previous frame from the first external storage component;
   wherein the internal storage apparatus comprises a first internal storage component and a second internal storage component; the writing, by the video compression control component, the video data corresponding to the original video data of the previous frame at the current same line number into the internal storage apparatus, and reading video data corresponding to original video data of the frame before the previous frame at the same line number from the internal storage apparatus comprises: in response to the video compression control component writing the video data corresponding to the original video data of the previous frame at the same line number into the first internal storage component, reading the video data corresponding to the original video data of the frame before the previous frame at the same line number from the second internal storage component; and in response to the video compression control component writing the video data corresponding to the original video data of the previous frame at the same line number into the second internal storage component, reading the video data corresponding to the original video data of the frame before the previous frame at the same line number from the first internal storage component.

8. The method as claimed in claim 2, wherein the writing all the original video data of the first frame into the external storage apparatus comprises:
   in response to that written video data is the original video data of the first frame, writing directly all the original video data of the first frame into the external storage apparatus without performing a determination process on the original video data of the first frame by the comparison component.

9. The method as claimed in claim 1, wherein the method further comprises:
   in response to the internal storage component is fully written, controlling the comparison component to write remaining original video data into the external storage apparatus.

10. The method as claimed in claim 1, the internal storage apparatus comprises:
    a storage apparatus of a baseboard management control chip.

11. The method as claimed in claim 1, the line number refers to position tag information of each pixel of a video image in the original video data.

12. The apparatus as claimed in claim 6, wherein the one or more processors is further configured to:
    in response to controlling the comparison apparatus to write the original video data of the current frame into the external storage apparatus, write the video data corresponding to the current same line number into the external storage apparatus; and in response to controlling the video compression control component to read the original video data of the previous frame from the external storage apparatus, read the video data corresponding to the current same line number.

13. The apparatus as claimed in claim 6, wherein the one or more processors is further configured to:
    in response to the comparison apparatus writing original video data of a first frame into the external storage apparatus, write all the original video data of the first frame into the external storage apparatus.

14. The apparatus as claimed in claim 12, wherein the one or more processors is further configured to:
control the video compression control component to compress the original video data of the previous frame to obtain compressed video data of the previous frame; and
write the compressed video data of the previous frame into the external storage apparatus.

15. The apparatus as claimed in claim 12, wherein the one or more processors is further configured to:
in response to the original video data of the previous frame read from the external storage apparatus by the video compression control component containing the tag information, read video data corresponding to original video data of a frame before the previous frame at the same line number from the internal storage apparatus.

16. The apparatus as claimed in claim 12, wherein the external storage apparatus comprises a first external storage component and a second external storage component; the one or more processors is further configured to:
in response to the comparison apparatus writing the original video data of the current frame into the first external storage component, read, by the video compression control component, the original video data of the previous frame from the second external storage component; and
in response to the comparison apparatus writing the original video data of the current frame into the second external storage component, read, by the video compression control component, the original video data of the previous frame from the first external storage component.

17. The apparatus as claimed in claim 15, wherein the internal storage apparatus comprises a first internal storage component and a second internal storage component; the writing, by the video compression control component, the video data corresponding to the original video data of the previous frame at the current same line number into the internal storage apparatus, and reading video data corresponding to original video data of the frame before the previous frame at the same line number from the internal storage apparatus comprises:
in response to the video compression control component writing the video data corresponding to the original video data of the previous frame at the same line number into the first internal storage component, reading the video data corresponding to the original video data of the frame before the previous frame at the same line number from the second internal storage component; and
in response to the video compression control component writing the video data corresponding to the original video data of the previous frame at the same line number into the second internal storage component, reading the video data corresponding to the original video data of the frame before the previous frame at the same line number from the first internal storage component.

* * * * *